US008552691B2

United States Patent
Wu

(10) Patent No.: US 8,552,691 B2
(45) Date of Patent: Oct. 8, 2013

(54) CHARGING CIRCUIT WITH FUNCTION OF AVOIDING BATTERY PULLING DOWN VOLTAGE OUTPUT FROM CHARGING DEVICE AND CHARGING METHOD THEREOF

(75) Inventor: Hai-Zhou Wu, Shenzhen (CN)

(73) Assignees: Shenzhen Futaihong Precision Industry Co., Ltd., Shenzhen (CN); Chi Mei Semiconductor Systems, Inc., New Taipei (TW)

( * ) Notice: Subject to any disclaimer, the term of this patent is extended or adjusted under 35 U.S.C. 154(b) by 322 days.

(21) Appl. No.: 13/031,260

(22) Filed: Feb. 21, 2011

(65) Prior Publication Data

US 2012/0161716 A1    Jun. 28, 2012

(30) Foreign Application Priority Data

Dec. 22, 2010    (CN) .......................... 2010 1 0600406

(51) Int. Cl.
*H02J 7/00*    (2006.01)
(52) U.S. Cl.
USPC ........................................................ 320/137
(58) Field of Classification Search
USPC ........................................................ 320/137
See application file for complete search history.

(56) References Cited

U.S. PATENT DOCUMENTS

| 4,247,899 | A | * | 1/1981 | Schiller et al. ................. 705/413 |
| 5,686,813 | A | * | 11/1997 | Huen et al. ..................... 307/150 |
| 6,774,604 | B2 | * | 8/2004 | Matsuda et al. ............... 320/110 |
| 7,425,815 | B2 | * | 9/2008 | Wong et al. .................... 320/141 |
| 7,733,060 | B2 | * | 6/2010 | Kojima .......................... 320/125 |
| 2003/0074588 | A1 | * | 4/2003 | Yin ................................ 713/300 |
| 2005/0253560 | A1 | * | 11/2005 | Popescu-Stanesti et al. . 320/138 |
| 2006/0284595 | A1 | * | 12/2006 | Hsieh et al. .................... 320/115 |
| 2008/0094037 | A1 | * | 4/2008 | Enjalbert et al. .............. 320/162 |
| 2008/0272741 | A1 | * | 11/2008 | Kanamori ...................... 320/137 |
| 2009/0130874 | A1 | * | 5/2009 | Englund ........................ 439/131 |
| 2009/0212741 | A1 | * | 8/2009 | Ferguson ....................... 320/134 |

* cited by examiner

*Primary Examiner* — Arun Williams
(74) *Attorney, Agent, or Firm* — Altis & Wispro Law Group, Inc.

(57) ABSTRACT

A charging circuit includes a main control microchip, a charging integrated circuit, and a current control circuit. The main control microchip includes a power-on pin connected to a charging device. The charging integrated circuit comprises a power input pin and a current limit pin, wherein the power input pin is connected to the charging device, and the charging integrated circuit is capable of limiting current. The current control circuit comprises a transistor, a first current limiting resistor and a second current limiting resistor, a base of the transistor is connected to the main control microchip, the first current limiting resistor is connected between the current limit pin and ground, and the second current limiting resistor is connected between the current limit pin and a collector of the transistor, the main control microchip is operable to output control signals to enable or disable the transistor.

14 Claims, 2 Drawing Sheets

CHARGING CIRCUIT WITH FUNCTION OF AVOIDING BATTERY PULLING DOWN VOLTAGE OUTPUT FROM CHARGING DEVICE AND CHARGING METHOD THEREOF

BACKGROUND

1. Technical Field

The disclosure generally relates to charging circuits, and more particularly relates to a charging circuit used in a portable electronic device and a charging method thereof.

2. Description of the Related Art

When voltage of a battery of a portable electronic device, such as a mobile phone is insufficient, the mobile phone can display a "lower power" notification until the battery is exhausted. Recharging of the battery can be performed by a mobile phone charger or USB interface charger.

However, since a charging current can be about 1 A at initial charging, the battery may pull down voltage output from the charging devices. At this time, a main control microchip of the mobile phone may not be able to provide startup capability due to the reduced voltage. Thus, inconvenience is caused.

Therefore, there is room for improvement within the art.

BRIEF DESCRIPTION OF THE DRAWINGS

Many aspects of an exemplary charging circuit and a charging method thereof can be better understood with reference to the following drawings. The components in the drawings are not necessarily drawn to scale, the emphasis instead being placed upon clearly illustrating the principles of the exemplary charging circuit. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
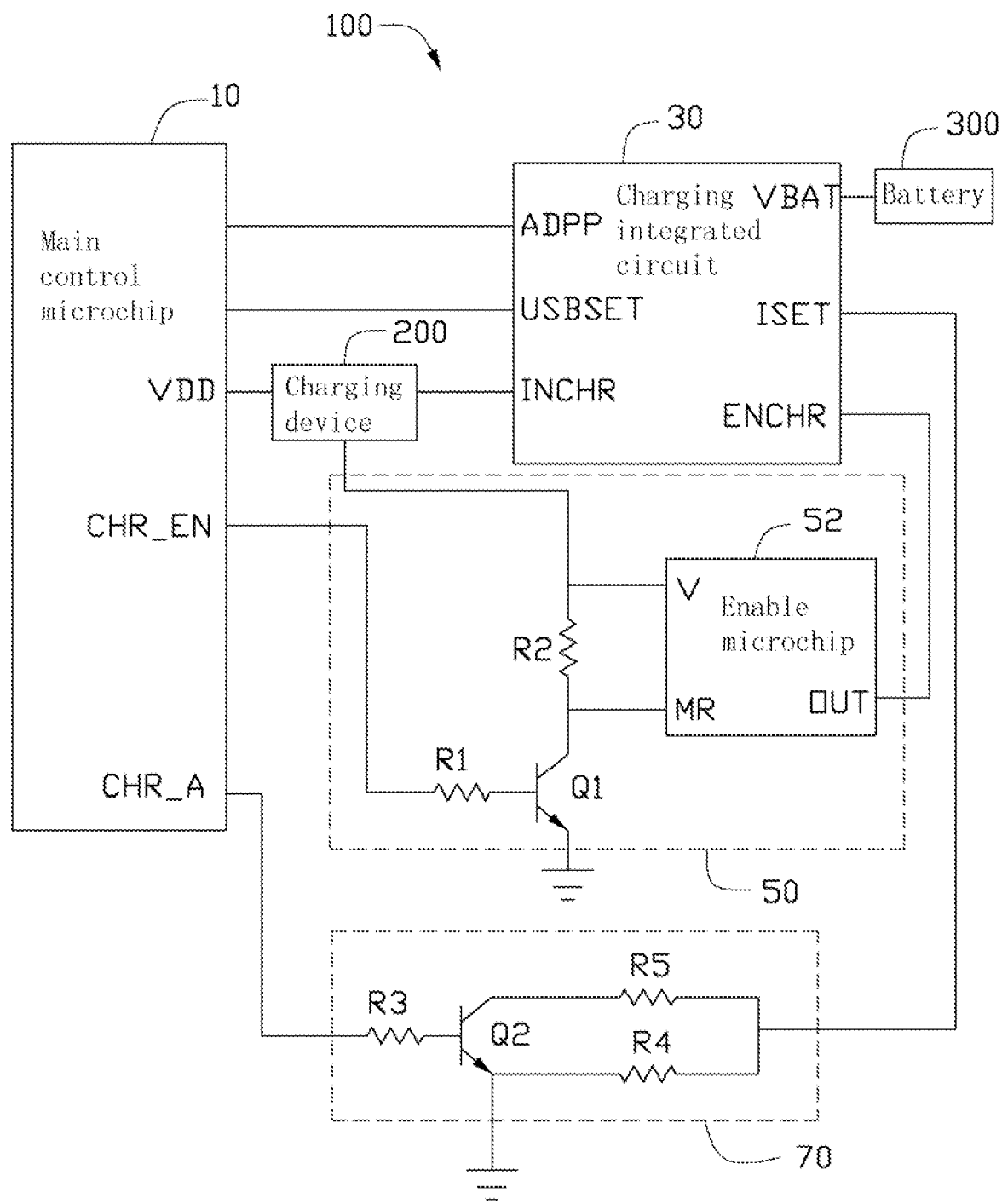
FIG. 1 is a circuit view of a charging circuit, according to an exemplary embodiment.

FIG. 1 shows a charging circuit 100, according to an exemplary embodiment. The charging circuit 100 can be used in a mobile phone, a personal digital assistant (PDA) or other portable electronic device that is capable of charging a battery 300 via a charging device 200. The charging device 200 can be a mobile phone charger or a USB interface charger, for example.

The charging circuit 100 includes a main control microchip 10, a charging integrated circuit 30, an enable circuit 50, and a current control circuit 70.

The main control microchip 10, capable of executing startup programs, includes a power-on pin VDD, a microchip enable pin CHR_EN, and a current control pin CHR_A. The power-on pin VDD is electronically connected to the charging device 200 to obtain power for the main control microchip 10. The microchip enable pin CHR_EN is operable to output a high voltage signal (e.g., logic 1) to the enable circuit 50 when the charging device 200 is connected to the portable electronic device, and output a low voltage signal (e.g., logic 0) to the enable circuit 50 when the charging device 200 is disconnected from the portable electronic device. The current control pin CHR_A is operable to output a low voltage signal to the current control circuit 70 when the main control microchip 10 executes the startup programs. After the main control microchip 10 is operational, the current control pin CHR_A can output high voltage signals to the current control circuit 70 if the charging device 200 is a mobile phone charger, or continue to output a low voltage signal to the current control circuit 70 if the charging device 200 is a USB interface charger.

The charging integrated circuit 30 includes a power input pin INCHR, a battery charging pin VBAT, a detection pin ADPP, an identification pin USBSET, a charge-enable pin ENCHR and a current limit pin ISET. The power input pin INCHR is connected to the charging device 200 to obtain power. The battery charging pin BVAT is connected to the battery 300 to transmit charging current to the battery 300. The detection pin ADPP is electronically connected to the main control microchip 10 to determine whether the charging device 200 is connected to the portable electronic device. The detection pin ADPP is capable of transmitting detected signals to the main control microchip 10 so that the main control microchip 10 can further control the enable circuit 50.

The identification pin USBSET is electronically connected to the main control microchip 10 and capable of identifying the charging device 200 as a mobile phone charger or USB interface charger by USB protocol after the main control microchip 10 is operational. Furthermore, the identification pin USBSET is operable to transmit identified signals to the main control microchip 10 so that the main control microchip 10 can further control the current control circuit 70. The charge-enable pin ENCHR is electronically connected to the enable circuit 50 and enabled in response to a high voltage signal. By controlling the enable circuit 50, the charge-enable pin ENCHR can enable or disable the charging integrated circuit 30. The current limit pin ISET is electronically connected to the current control circuit 70 and capable of limiting the charging current output from the battery charging pin BVAT. In this exemplary embodiment, the charging current output from the battery charging pin BVAT is no more than that through the current limit pin ISET.

The enable circuit 50 is directed by the main control microchip 10 to output control signals to the charge-enable pin ENCHR. The enable circuit 50 includes a first resistor R1, a first transistor Q1, a second resistor R2, and an enable microchip 52. The first resistor R1 is connected between the microchip enable pin CHR_EN of the main control microchip 10 and the base of the first transistor Q1. The first transistor Q1 is a npn transistor, the emitter of which is connected to ground. The second resistor R2 is connected between the charging device 200 and the collector of the first transistor Q1. In this exemplary embodiment, the first resistor R1 and the second resistor R2 are both about 10 kΩ. The enable microchip 52 is capable of outputting a high voltage signal or a low voltage signal according to collector voltage of the first transistor Q1. The enable microchip 10 includes a power pin V, a voltage detection pin MR and an output pin OUT. The power pin V is connected to the charging device 200 to obtain power. The voltage detection pin MR is connected to the collector of the first transistor Q1 to detect the collector voltage of the first transistor Q1. The output pin OUT is connected to the charge-enable pin ENCHR of the charging integrated circuit 30. In use, the output pin OUT outputs a high voltage signal when the collector voltage of the first transistor is more than 3.5V, and a low voltage signal when the collector voltage of the first transistor is less than 1.5V.

The current control circuit 70 is operable to control the charging current of the charging integrated circuit 30. The current control circuit 70 includes a base resistor R3, a second transistor Q2, a first current-limiting resistor R4, and a second current-limiting resistor R5. The base resistor R3 is connected between the current control pin CHR_A and the base of the second transistor Q2. The second transistor Q2 is a npn transistor, the emitter of which is connected to ground. The first current-limiting resistor R4 is connected between the current limit pin ISET and ground. The second current-limiting resistor R5 is connected between the current limit pin ISET and the collector of the second transistor Q2. In this exemplary embodiment, the first current-limiting resistor R4 and the second current-limiting resistor R5 are about 3.84 kΩ and about 3.3 kΩ, respectively.

Figure 2:
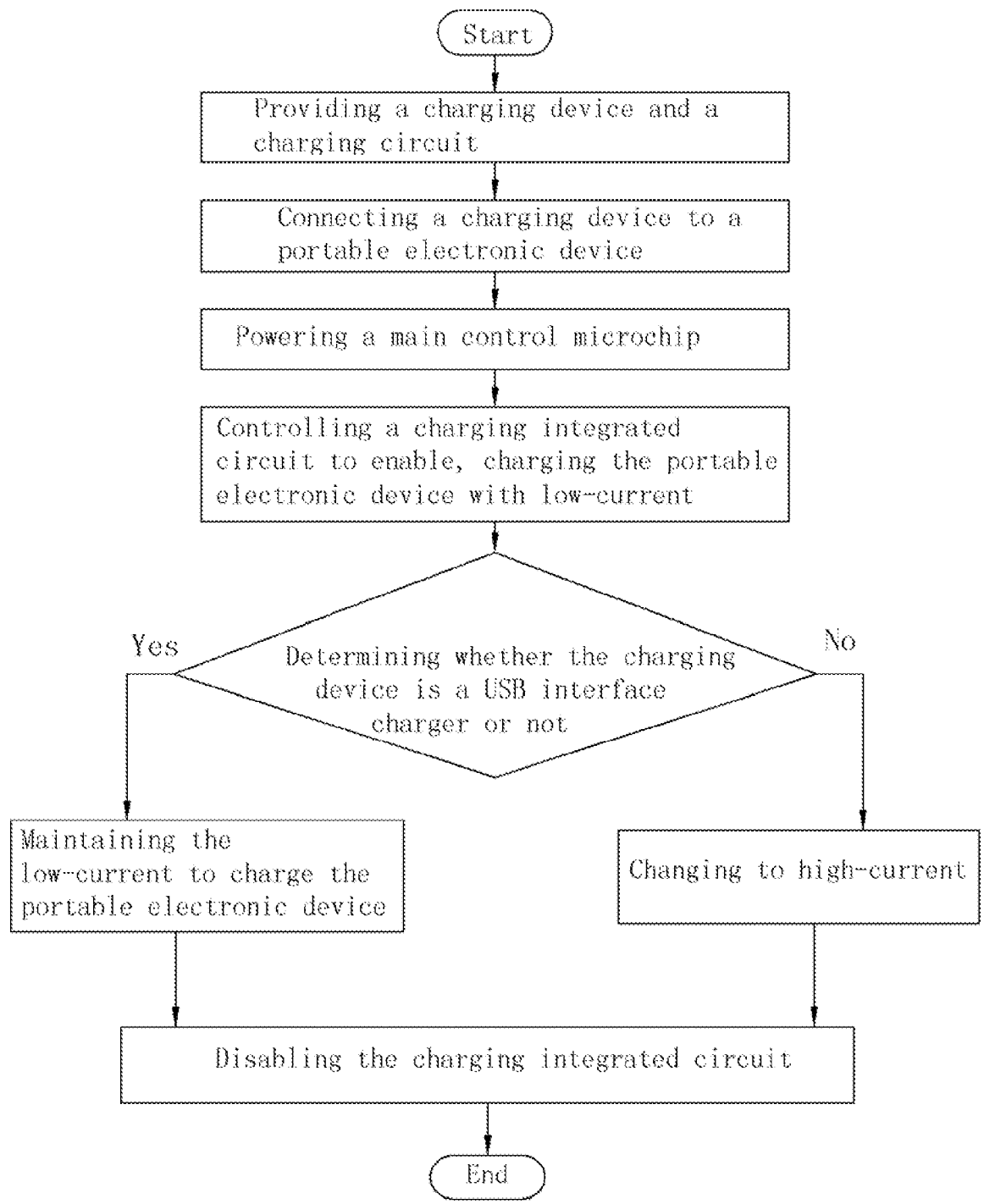
FIG. 2 is a flowchart illustrating a charging method, according to an exemplary embodiment.

Also referring to FIG. 2, when voltage of the battery 300 is insufficient, the charging device 200 is connected to the portable electronic device to supply 5V voltage to the battery 300. The main control microchip 10 can thus obtain enough voltage to execute the startup programs, since the power-on pin VDD of the main control microchip 10 is directly connected to the charging device 200. Simultaneously, the microchip enable pin CHR_EN outputs a low voltage signal to the base of the first transistor Q1 when the charging device 200 is detected by the detection pin ADPP. The first transistor Q1 is disabled and which collector voltage is more than 3.5V so that the output pin OUT outputs a high voltage signal to enable the charging integrated circuit 30.

At this time, the current control pin CHR_A outputs a low voltage signal to the base of the second transistor Q2 to disable the second transistor Q2. Thus, current through the current limit pin ISET is pulled down by the first current-limiting resistor R4, and the charging current of the battery charging pin VBAT is further limited by the current of the current limit pin ISET so that the charging integrated circuit 30 can charge the battery 300 with low-current (the low-current is about 500 mA). Since the low-current cannot pull down the voltage output from the charging device 200, the main control microchip 10 can execute the startup programs smoothly.

After the main control microchip 10 is operational, the identification pin USBSET can identify the charging device 200 as a mobile phone charger or USB interface charger. If the charging device 200 is a USB interface charger, the current control pin CHR_A continues to output a low voltage signal to the base of the second transistor Q2 to maintain the low-current for charging. If the charging device 200 is a mobile phone charger, the current control pin CHR_A outputs a high voltage signal to the base of the second transistor Q2 to enable the second transistor Q2. The first current-limiting resistor R4 is connected to the second current-limiting resistor R5 in parallel to reduce total resistance. Thus, current through the current limit pin ISET is increased, and the charging current of the battery charging pin VBAT is increased correspondingly, for charging the battery 300 with high current of about 900 mA.

When the charging device 200 is disconnected from the portable electronic device or encounters charging errors, the microchip enable pin CHR_EN outputs a high voltage signal to the base of the first transistor Q1 to enable the first transistor Q1. Voltage of the collector is less than 1.5V so that the output pin OUT outputs a low voltage signal to the charge-enable pin ENCHR. Thus, the charging integrated circuit 30 is disabled.

The charge circuit 100 can charge the battery 300 with low-current while the main control microchip 10 is executing the startup programs to avoid the battery 300 pulling down the voltage output from the charging device 200. Thus, the portable electronic device can be turned on at an initial charging time.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A charging circuit connecting a charging device with a battery, the charging circuit comprising:
    a main control microchip including a power-on pin;
    an enable circuit;
    a charging integrated circuit comprising a power input pin, a battery charging pin, and a current limit pin; and
    a current control circuit comprising a transistor, a first current limiting resistor, and a second current limiting resistor;
    wherein the power-on pin is directly and electronically connected to the charging device; the enable circuit is connected to the main control microchip and capable of enabling or disabling the charging integrated circuit; the power input pin is connected to the charging device, the battery charging pin is connected to the battery, and the charging integrated circuit is capable of limiting charging current output from the battery charging pin according to current through the current limit pin; a base of the transistor is connected to the main control microchip, and an emitter of the transistor is connected to ground; the first current limiting resistor is connected between the current limit pin and ground, and the second current limiting resistor is connected between the current limit pin and a collector of the transistor; the main control microchip is operable to output control signals to enable or disable the transistor to adjust current through the current limit pin.

2. The charging circuit as claimed in claim 1, wherein the charging integrated circuit further comprises an identification pin, the identification pin is capable of identifying the charging device as a mobile phone charger or USB interface charger, and transmitting identified signals to the main control microchip.

3. The charging circuit as claimed in claim 2, wherein the main control microchip is operable to output a high voltage signal to the base of the transistor when the charging device is a mobile phone charger, and a low voltage signal to the base of the transistor when the charging device is a USB interface charger.

4. The charging circuit as claimed in claim 1, wherein the current control circuit further includes a base resistor connected between the base of the transistor and the main control microchip.

5. The charging circuit as claimed in claim 1, wherein the charging integrated circuit further comprises a charge-enable pin, the charge-enable pin is connected to the enable circuit for receiving control signals output from the enable circuit.

6. The charging circuit as claimed in claim 5, wherein the enable circuit includes a first resistor, another transistor, and a second resistor, the first resistor is connected to the base of the transistor of the enable circuit, the emitter of the transistor of the enable circuit is connected ground, the second resistor is connected between the charging device and the collector of the transistor of the enable circuit.

7. The charging circuit as claimed in claim 6, wherein the enable circuit further includes an enable microchip, the enable microchip provides a power pin, a voltage detection pin and an output pin, the power pin is connected to the charging device, the voltage detection pin is connected the collector of the transistor of the enable circuit, and the output pin is connected to the charge-enable pin of the charging integrated circuit.

8. The charging circuit as claimed in claim 6, wherein the output pin outputs a high voltage signal to enable the charging integrated chip when the collector voltage of the transistor of the enable circuit is more than a predetermined voltage, and the output pin outputs a low voltage signal to disable the charging integrated chip when the collector voltage of the transistor of the enable circuit is less than another predetermined voltage.

9. The charging circuit as claimed in claim 6, wherein the charging integrated circuit further comprises a detection pin connected to the main control microchip, the detection pin is capable of detecting whether the charging device is connected; the main control microchip outputs a low voltage signal to the base of the transistor of the enable circuit when the charging device is connected, and outputs a high voltage signal to the base of the transistor of the enable circuit when the charging device is disconnected.

10. The charging circuit as claimed in claim 1, wherein the first current limiting resistor and the second current limiting resistor are 3.84 kΩ and 3.3 kΩ, respectively.

11. A charging method for a portable electronic device, comprising:
    providing a charging device and a charging circuit, the charging circuit including a charging integrated circuit and a main control microchip electronically connected to the charging device and the charging integrated circuit;
    connecting the charging device to the portable electronic device;
    powering the main control microchip to allow the main control microchip to execute startup programs;
    charging the portable electronic device with low-current by the charging integrated circuit when the main control microchip executes the startup programs; and
    determining if the charging device is a mobile phone charger or a USB interface charger by the charging integrated circuit after the main control microchip is operational, and maintaining the low-current to charge the portable electronic device through the charging integrated circuit if the charging device is a USB interface charger, and changing to high-current if the charging device is a mobile phone charger.

12. The charging method as claimed in claim 11, further comprising controlling the charging integrated circuit to enable by an enable circuit.

13. The charging method as claimed in claim 12, further comprising outputting a low voltage signal to the enable circuit via the main control microchip when the main control microchip executes the startup programs.

14. The charging method as claimed in claim 11, further comprising outputting a low voltage signal to a current control circuit via the main control microchip when the main control microchip executes the startup programs, and outputting a low voltage signal to the current control circuit if the charging device is the USB interface charger, and outputting a high voltage signal to the current control circuit if the charging device is the mobile phone charger.

* * * * *